US 008756288B2

(12) United States Patent
Bedi et al.

(10) Patent No.: US 8,756,288 B2
(45) Date of Patent: Jun. 17, 2014

(54) PUBLISH/SUBSCRIBE MESSAGE ROUTING

(75) Inventors: Bharat V. Bedi, Portsmouth (GB);
Helen S. Bowyer, Romsey (GB); Kevin C. Brown, Chandlers Ford (GB);
Edward G. Jellard, Southampton (GB);
Robert S. Smart, Chandlers Ford (GB);
Graham White, Alton (GB)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 13/370,822

(22) Filed: Feb. 10, 2012

(65) Prior Publication Data

US 2012/0233268 A1    Sep. 13, 2012

(30) Foreign Application Priority Data

Mar. 11, 2011  (EP) .................................... 11157893

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| 6,643,682 | B1 | 11/2003 | Todd et al. |
| 6,944,662 | B2 | 9/2005 | Devine et al. |
| 7,643,511 | B2 | 1/2010 | Barri et al. |
| 7,734,723 | B2 | 6/2010 | Bedi et al. |
| 7,965,708 | B2 | 6/2011 | Cohen et al. |
| 8,369,527 | B2 * | 2/2013 | Carmeli et al. ............... 380/278 |
| 8,576,881 | B2 | 11/2013 | Jungck et al. |
| 2008/0082614 | A1 | 4/2008 | Bedi et al. |
| 2008/0133541 | A1 * | 6/2008 | Fletcher et al. ................. 707/10 |
| 2008/0198753 | A1 * | 8/2008 | Choudhury et al. .......... 370/242 |
| 2010/0306264 | A1 * | 12/2010 | Fletcher et al. ............... 707/776 |
| 2012/0131597 | A1 * | 5/2012 | Han et al. ...................... 719/313 |
| 2012/0233272 | A1 | 9/2012 | Bedi et al. |

OTHER PUBLICATIONS

DLB-SDPOP: A Multiagent Pseudo-tree Repair Algorithm for Load Balancing in WLANs published by Shanjun Cheng (Cheng) on Aug. 31, 2010.*
Bharat Veer Bedi et al., U.S. Appl. No. 11/764,823, filed: Jun. 19, 2007.
Bharat V. Bedi et al., U.S. Appl. No. 13/407,199, filed: Feb. 28, 2012.

* cited by examiner

*Primary Examiner* — Kevin Bates
*Assistant Examiner* — Ronak Patel
(74) *Attorney, Agent, or Firm* — Marcia L. Doubet

(57) ABSTRACT

Message routing in a publish/subscribe system where messages are routed from one or more publishers to one or more subscribers according to respective defined paths through a topic tree. A pseudo-topic tree path comprised of a partial path definition and a selection function is specified by a subscriber or publisher. When executed, the selection function searches the topic tree to identify one or more path definition segments, which segments replace the selection function in the pseudo-topic tree path to generate one or more complete path definitions that are then usable for routing messages.

15 Claims, 8 Drawing Sheets

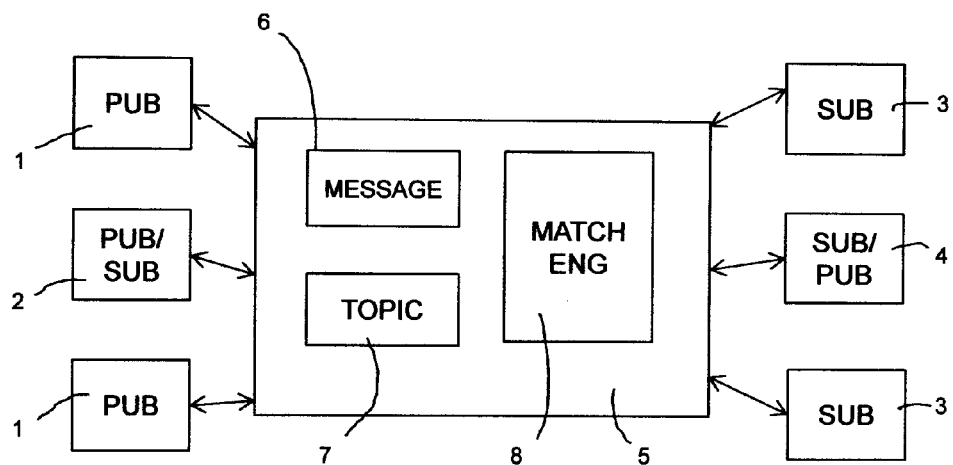

FIG. 1

/country/uk/city/london/temperature/celsius = 1  /201
/country/uk/city/birmingham/temperature/celsius = 2  /203
/country/uk/city/southampton/temperature/celsius = 3
/country/uk/city/bristol/temperature/celsius = 4
/country/uk/city/manchester/temperature/celsius = 5
/country/uk/city/liverpool/temperature/celsius = 6
/country/uk/city/leeds/temperature/celsius = 7
/country/uk/city/edinburgh/temperature/celsius = 8
/country/uk/city/glasgow/temperature/celsius = 9
/country/uk/city/cardiff/temperature/celsius = 10
/functions/celsiusToFahrenheit

FIG.2

/functions/myFunction(params) -> { statements of myFunction }

FIG. 10A

/functions/ibmBrands(type) ->

{
    if (type=="software")
        {
            return(["WebSphere","Rational","Information_Management","Tivoli","Lotus"]);
        }
    elseif (type=="hardware")
        {
            return(["System_i","System_p","System_z","System_x"]);
        }
}

FIG. 10B

PUBLISH/SUBSCRIBE MESSAGE ROUTING

BACKGROUND

The present invention relates generally to the field of computers and computer systems. More particularly, the present invention relates to publish/subscribe messaging systems providing controlled distribution of messages from a source to one or more targets.

Publish/subscribe is known as an effective technique for handling of message queues. Rather than directly identifying an intended recipient for a message, the originator (publisher) publishes the message to a topic, which topic is typically identified in the message header. One or more recipients (subscribers) can then arrange to receive such messages by subscribing to the topic. A message handling or brokering stage sits between the publishers and subscribers and handles the routing of published messages to subscribers according to topic. In this way, the publisher does not need to know the identities of the various subscribers and the subscribers do not need to know the publisher providing the source of the messages.

Within the brokering stage, the identities of the topics supported are stored in a structure known as a topic tree. In one known arrangement, the topic tree is organised as a hierarchy, with the broadest grouping of topics forming the base or root level of the hierarchy, and with successive levels adding further restrictions or limitations. For example, a root level may be "Cities of the World", with successive levels then comprising "Europe", "United Kingdom", and "London". Other arrangements are possible.

U.S. Pat. No. 6,643,682 (Todd, et al.) describes an example of a publish/subscribe system that provides extended functionality through allowing the modification of message content at the broker stage, for example to apply local currency exchange rates. This is achieved by incorporating one or more message transformation subsystems within the broker, which subsystems apply a transform function to the data payload of selected messages. A disadvantage with this system is that modifying the message will result in a change of topic, which may cause housekeeping problems within the broker in terms of the integrity of the topic tree. A further disadvantage is that allowing the subscribers to subscribe to particular transforms relies on the transforms being available on the broker.

U.S. Pat. No. 7,734,723 (Bedi, et al.) is another example of a publish/subscribe system which seeks to address a first problem of U.S. Pat. No. 6,643,682, namely the modification of topics. In this instance, the publisher does not specify the topic directly, but instead sends topic data which is then processed to generate a topic within the message broker. Topic data is in the form of a function and an associated parameter list, and is associated with a message (typically, inserted in the message header) in the same way that a topic would be inserted in previous systems. Topic consistency is now provided, but the availability of transform functions is constrained as before.

A general problem of publish/subscribe systems is that, when publishing or subscribing to a message broker, the client must know explicitly which topics to publish or subscribe to. One approach to this problem is to use wildcards whereby, during subscription, there are wildcard mechanisms that can be used to subscribe to a set of topics. Wildcards provide for a simple matching mechanism to be applied to the topic tree, allowing subscription to all subtopics or the set of all topics within a topic tree. For example, using the "+" and "#" wildcards, the topic tree path definition:
/a/b/+/x/y/z
would return the topics
/a/b/c/x/y/z
/a/b/d/x/y/z
/a/b/e/x/y/z
and so on, whilst the path definition
/a/b/c/#
would return
/a/b/c/d
/a/b/c/d/e
/a/b/c/f
and so on.

Wildcards are, by their nature, a coarse tool that will often generate unwanted results in addition to what is required. Also, it will be understood that this option is restricted to subscribing: there is no equivalent option for publishers.

An alternative approach is to control message flows. Defined as a sequence of processing steps that run in the broker when an input message is received, message flows are managed on the server side—that is to say, a client would need broker administrative access to define, change, or remove a message flow definition. This is not a simple matter and the facility is generally not available to clients.

BRIEF SUMMARY

Embodiments of the present invention are directed toward enabling improved operational flexibility in the selection of topics for routing messages in a publish/subscribe system that routes messages from at least a first publisher to one or more subscribers according to one or more defined paths through a topic tree. In one aspect, this comprises: receiving a message, the message including selection function data defining a selection function; identifying and extracting the selection function data; storing the extracted selection function data in a memory; creating, for the received message, a pseudo-topic tree path comprised of a partial path definition and the selection function; searching data defining the topic tree, according to the selection function, to return one or more path definition segments; inserting the (or each) returned path definition segment into respective copies of the partial path definition to produce one or more complete path definitions; and routing messages according to the (or each) generated complete path definition.

The summary of the present invention does not recite all the necessary features of the invention, and sub-combinations of those features may also encompass the invention.

DETAILED DESCRIPTION OF THE SEVERAL VIEWS OF THE DRAWINGS

The present invention will now be described, by way of example only, with reference to preferred embodiments, as illustrated in the following figures, in which:

FIG. 1 represents components of a publish/subscribe system suitable to embody preferred embodiments of the invention;

FIG. 2 is a representation of a topic tree, in accordance with a preferred embodiment of the invention;

Figure 5A:
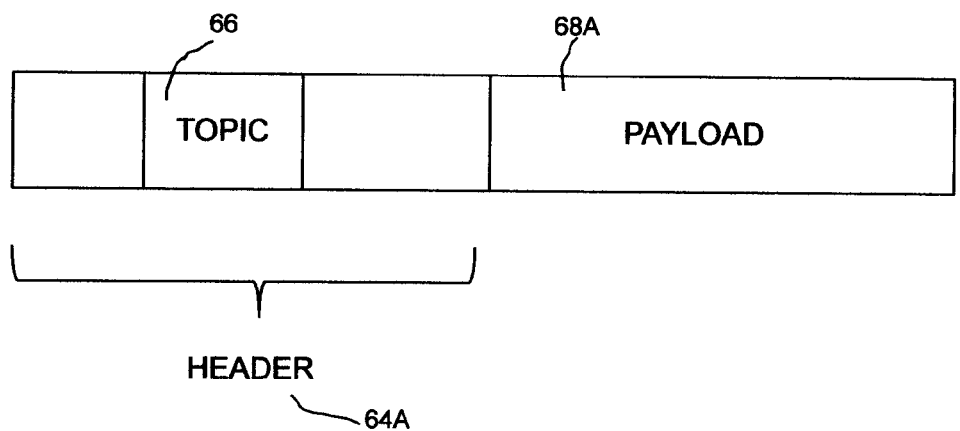
Figure 5B:
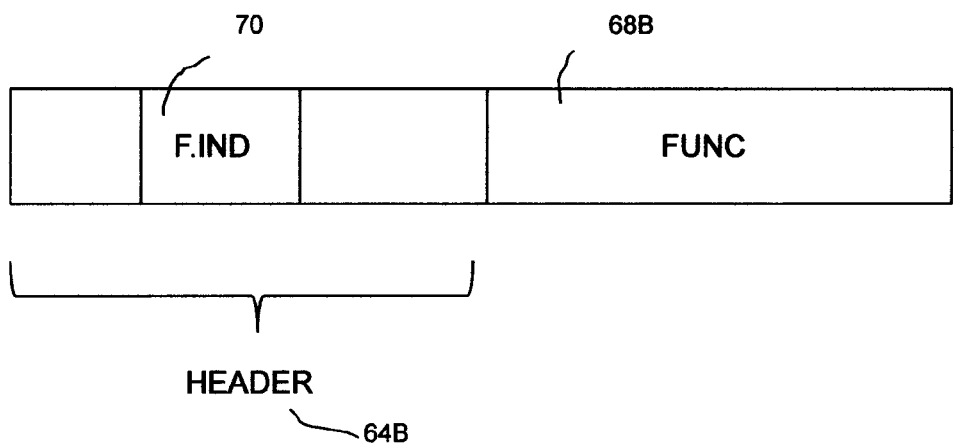
Figure 6:
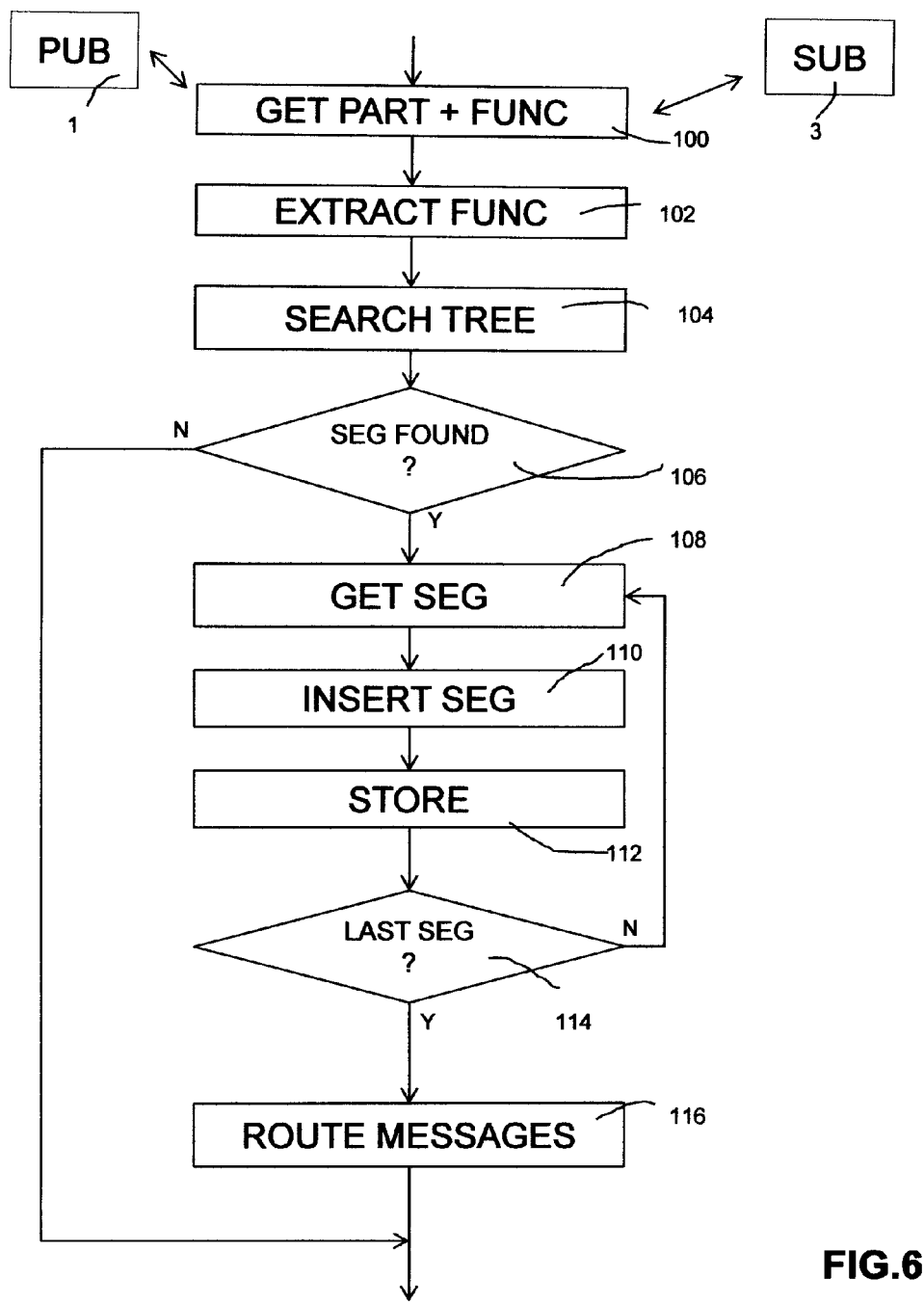
Figure 7:
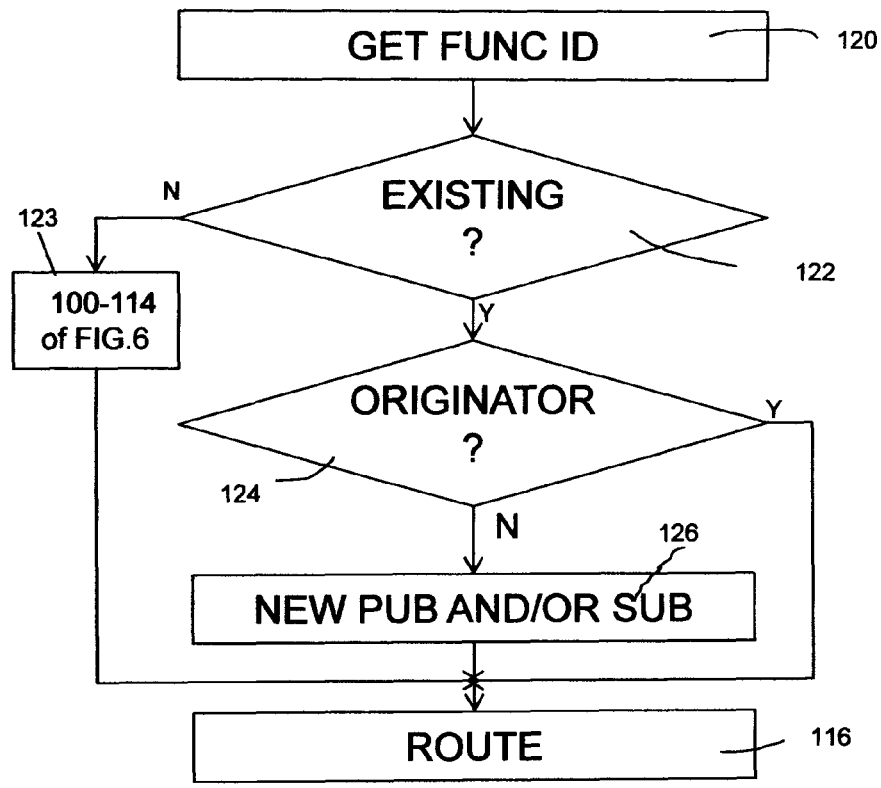
Figure 8:
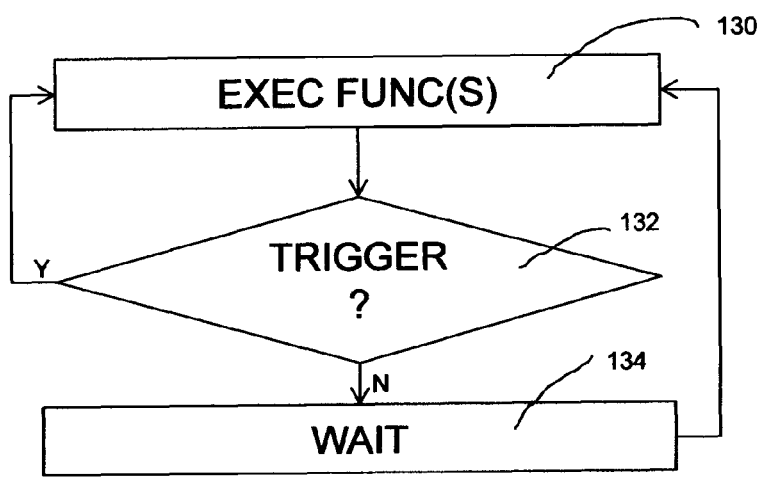
Figure 9:
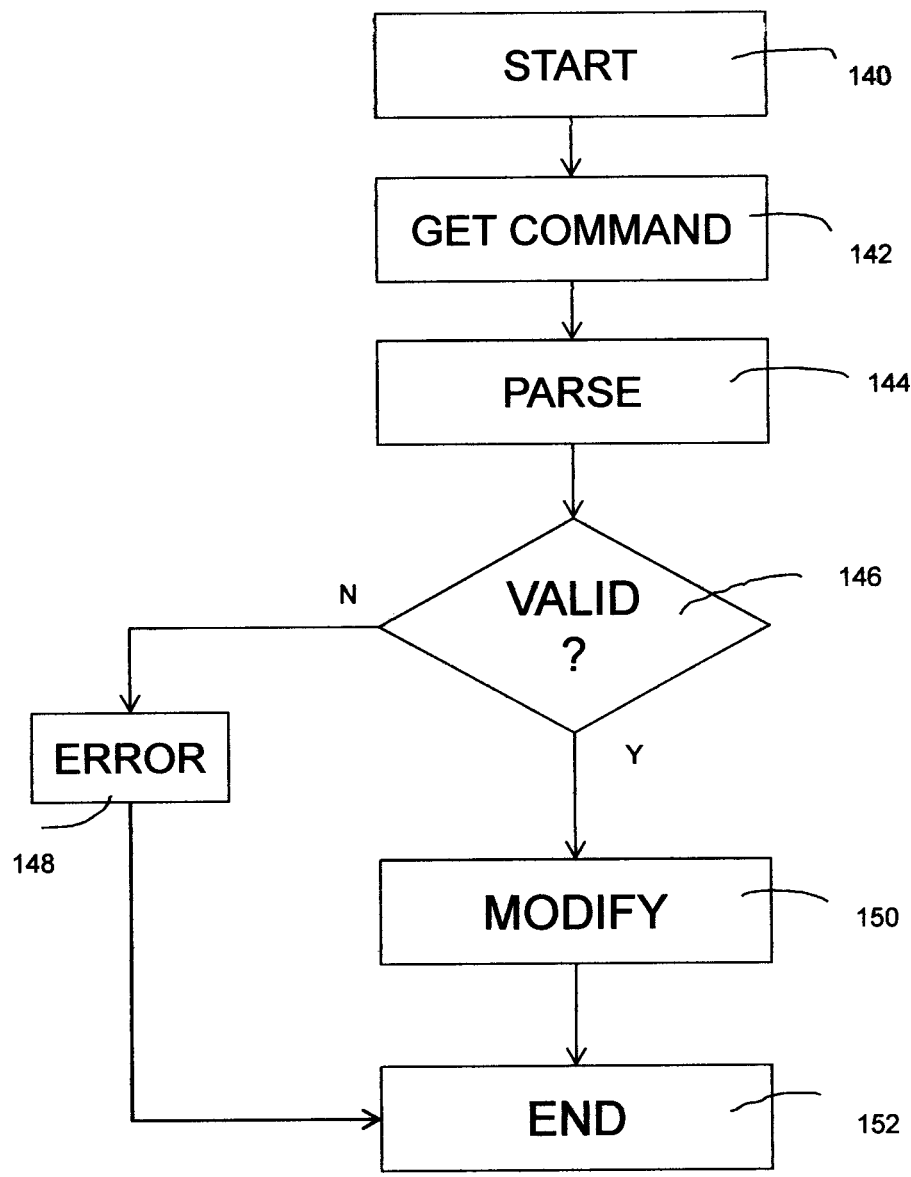

FIGS. 5A and 5B respectively schematically represent data and function messages received by a message broker, respectively, in accordance with a preferred embodiment of the invention;

FIG. 6 is a flowchart representation of a method, in accordance with a preferred embodiment of the invention;

FIG. 7 represents use of the invention by clients not originating functions, in accordance with a preferred embodiment of the invention;

FIG. 8 represents periodic updating of a selection function, in accordance with a preferred embodiment of the invention;

FIG. 9 is a flowchart representation of control command handling, in accordance with a preferred embodiment of the invention; and FIGS. 10A and 10B provide examples which are discussed herein.

DETAILED DESCRIPTION

The present invention provides a mechanism by which a client can register functions with a broker and apply these functions to the topic tree during both publish and subscribe. This can be thought of as similar to wildcards, but instead of using traditional wildcard symbols, a function call is made in their place.

Wildcards problems are thereby addressed by allowing a more flexible matching mechanism to be used on the topic tree than is currently available, and by providing functionality for both publish and subscribe whilst retaining the wildcard ability to dynamically match more or fewer topics as the topic tree changes. Contrary to the limited options available in a message flows arrangement, an embodiment of the present invention allows a client to register functions with a broker, and for these to be run by the registering client or by other clients.

As disclosed herein, by providing the facility to use a selection function to find candidates to fill the "missing" parts of a path definition, a more accurate choice is possible than with a simple wildcard. The selection function is suitably supplied by a user and thus the user is not constrained to a limited set of functions pre-loaded to a broker. Furthermore, as will be described in greater detail below, the added functionality arising from use of the selection function is available to both subscribers and publishers.

In an apparatus embodying the present invention, a first subscriber may subscribe to a pseudo-topic by originating the message including data defining the selection function, and a matching engine may be adapted to route to the first subscriber all messages having a topic defined by the (or each) resulting complete path definition. The selection function will return zero, one, or several results such that the subscriber to the pseudo-topic is effectively subscribed to zero, one, or several topics simultaneously.

As mentioned above, the present invention is not limited to subscribers. A first publisher may establish a pseudo-topic by originating the message including data defining the selection function, with the matching engine then being adapted to route from the first publisher all messages having a topic defined by the (or each) resulting complete path definition. In other words, the publisher can publish to a targeted selection of topics without having to separately publish to each.

In an apparatus embodying the present invention, a search engine may be adapted to periodically perform a search of the topic tree in respect of each stored selection function, with the matching engine then being adapted to route existing messages to subscribers to topics defined by any newly resulting complete path definitions. Suitably, the search engine is adapted to perform the search whenever the data defining the topic tree is modified.

A first message handler may be adapted to, on receipt of a predetermined command, modify or delete stored function data. Additionally, it may be adapted to store the selection function data in a predetermined location within the topic tree.

Also in accordance with the present invention, there is provided a method of message routing in a publish/subscribe system where messages are routed from one or more publishers to one or more subscribers according to respective defined paths through a topic tree, comprising: creating a pseudo-topic tree path comprised of a partial path definition and a selection function, which function when executed searches the topic tree to identify one or more path definition segments; replacing the selection function in the pseudo-topic tree path with respective ones of the identified one or more path definition segments to generate one or more complete path definitions; and routing messages according to the (or each) generated complete path definition.

As mentioned above, a first subscriber may subscribe to a pseudo-topic by originating the selection function, such that all messages having a topic defined by the (or each) resulting complete path definition are routed to that first subscriber. Suitably, this functionality may be extended by enabling a second subscriber (or plural further subscribers) to subscribe to a pseudo-topic originated by the first subscriber.

A first publisher may establish a pseudo-topic by originating the selection function, such that all messages published to the pseudo-topic by the first publisher are published to topics identified by the (or each) resulting complete path definition. This functionality may be extended such that, on receipt of a request from a second publisher, messages from that second publisher are published to subscribers to topics identified by a pseudo-topic originated by the first publisher.

The invention further provides a computer program stored on a computer readable medium and loadable into the internal memory of a digital computer, comprising software code portions, when the program is run on a computer, for performing a method according to the invention.

FIG. 1 shows components of a publish/subscribe system suitable to embody the present invention and comprising a plurality of publishers 1, 2 and subscribers 3, 4 with an intermediary broker 5. As represented at 2 and 4, some publishers may also be subscribers and vice versa. The broker 5 includes a store 6 for holding received messages, and a topic tree store 7 holding a hierarchical data structure of topics available for subscription. FIG. 2 illustrates such a topic tree. Also comprised within the browser 5 is a matching engine 8 used in the matching of published messages to subscribers to particular topics.

Figure 3:
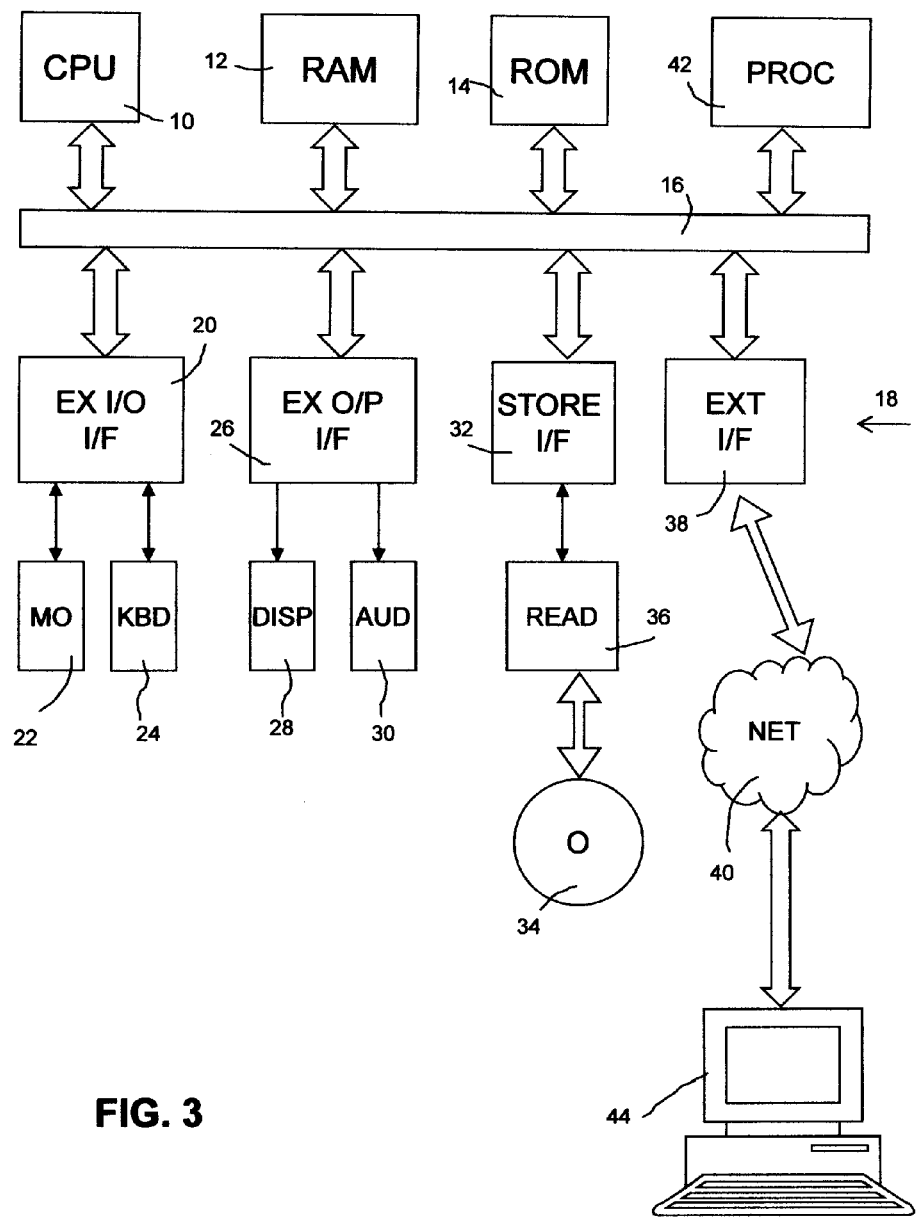
FIG. 3 is a block schematic diagram of the components of a multiprocessor computer system, in accordance with a preferred embodiment of the invention.

FIG. 3 schematically represents the components of a computer system suitable to embody the broker 5 of FIG. 1. A processor CPU 10 is coupled with random access memory (RAM) 12 and read only memory (ROM) 14 by an address and data bus 16. Referring back to FIG. 1, RAM 12 holds the message 6 and topic tree 7 stores, and the CPU provides the matching engine 8. Also connected to CPU 10 via the address and data bus 16 is a further processor 42, which may be a further CPU sharing tasks with the first CPU 10, or may be a coprocessor device 42 supplementing the function of the CPU 10, handling processes such as floating point arithmetic, graphics processing, signal processing, and encryption. Each of these internal hardware devices 10, 12, 14, 42 includes a respective interface (not shown) supporting connection to the bus 16. These interfaces are conventional in form and need not be described in further detail Also connected to the CPU 10 via bus 16 are a number of external hardware device interface stages (generally denoted 18). A first interface stage 20 supports the connection of external input/output devices, such as a mouse 22 and/or keyboard 24. A second interface stage 26 supports the connection of external output devices such as a display screen 28 and/or audio output device 30, such as headphones or speakers. A third interface stage 32 supports the connection to external data storage devices in the form of computer readable media. Such external data storage may, as shown, be provided by a removable optical or magnetic disc 34 (accessed by a suitably configured disc reader 36). Alternatively or additionally, the external storage may be in the form of a solid state memory device such as an extension drive or memory stick. The external storage may contain a computer program, containing program software code portions which, when run by the CPU 10, perform a method according to the present invention. A fourth interface stage 38 supports connection of the system to remote devices or systems via wired or wireless networks 40, for example over a local area network LAN or via the internet. A further computer system 44 hosting a publisher and/or subscriber is shown coupled via network 40.

Figure 4:
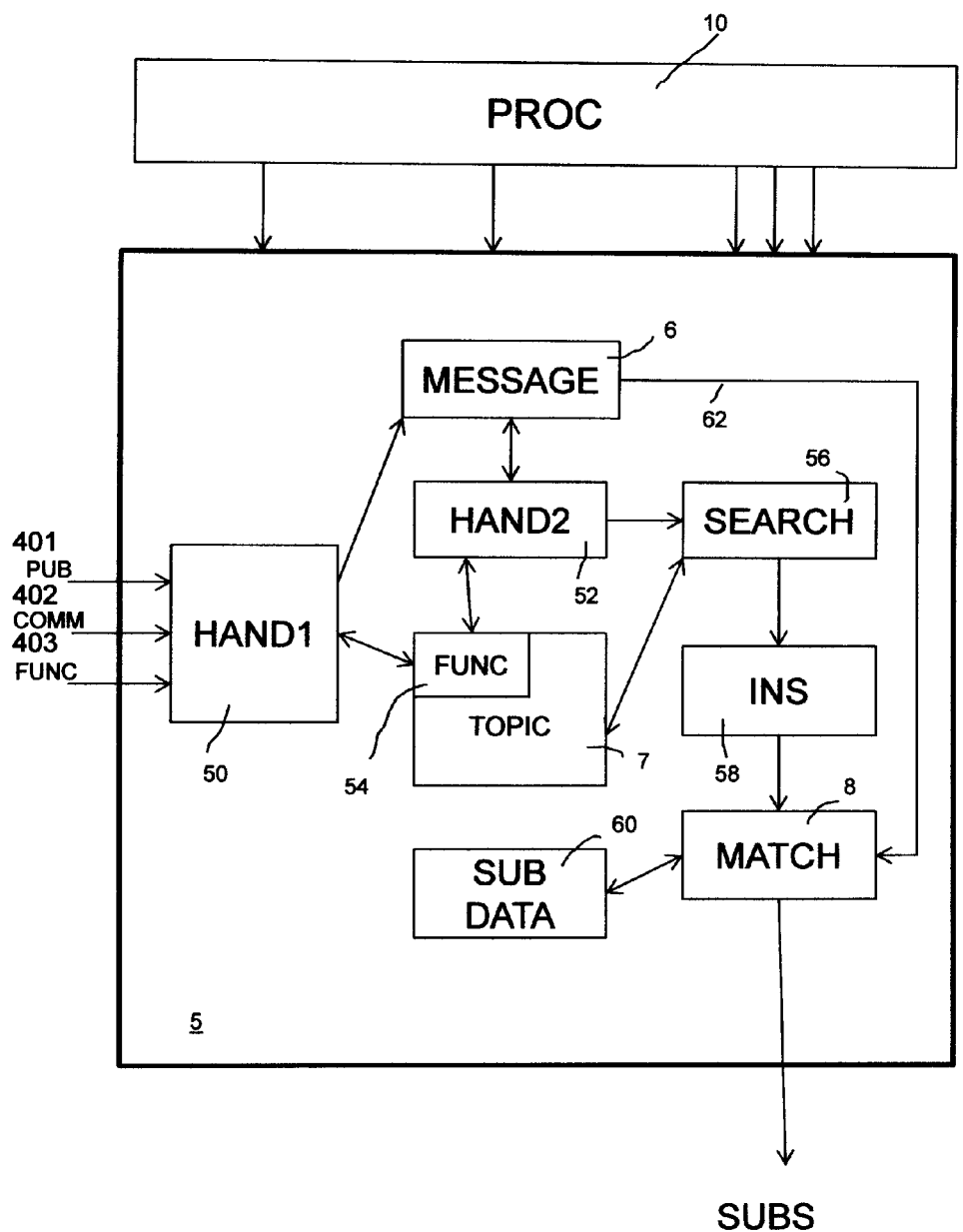
FIG. 4 shows functional components of a message broker in the system of FIG. 1, in accordance with a preferred embodiment of the invention.

FIG. 4 shows in more detail the functional components of the broker 5 of FIG. 1. Controlling operation is a processor 10 (such as CPU 10 of FIG. 3) which links to a first message handler stage 50 for handling publication messages (see PUB 401) from a publisher, and function data messages (see FUNC 403) from a publisher or subscriber. The message handler 50 (which may functionally be a feature of processor 10) is arranged to identify incoming messages, extract the content therefrom, and store it in memory. Where the message handler 50 receives a data message (PUB) for conventional publication to a single topic, the form of the message may be generally as illustrated in FIG. 5A, comprising a header portion 64A including topic data 66, and a data payload 68A for onward transmission to one or more subscribers. These messages are buffered or queued in message store 6.

When message handler 50 receives a function message (FUNC) containing a selection function to be applied for the selection of topics to which a message payload is to be published, the form of the message may be generally as illustrated in FIG. 5B, comprising a header portion 64B including a function indicator 70, and a payload portion 68B comprising function data. The function data is extracted and stored in a dedicated (reserved) area 54 of the topic tree in memory 7. This part of the topic tree could be reserved at a fixed location for all servers, or more practicably, an administrator-defined topic area is reserved instead. As shown by the last entry in the example topic tree of FIG. 2, all functions are suitably stored under the topic /functions (also referred to herein as the "reserved function topic" or "reserved function area"). The reserved function topic stores both the function definitions and the code associated with that function. The name and parameters of a function are stored as a sub-topic of the reserved function area, and the function code is the payload of that sub-topic.

A further input type COMM 402 to the first message handler 50 receives control commands relating to modification or deletion of stored functions. This is described in more detail below.

A further message handler stage 52 (which may functionally be a feature of processor 10) is coupled with the message 6 and topic tree 7 stores and is adapted to create a pseudo-topic tree path comprised of a partial path definition and the selection function.

Also linked to, and optionally hosted by, processor 10 is a search engine 56 connected with the second handler 52 and topic tree store 7. The search engine 56 is adapted to extract the selection function to be applied to the topic tree from topic tree memory 7, and to apply that function to identify zero, one, or several path definition segments that match the selection criteria specified.

From search engine 56, the (or each) located path definition segment is passed to an inserter stage 58 linked to, and optionally hosted by, processor 10. The inserter stage 58 is configured to insert the (or each) located segment into respective copies of the partial topic tree path associated with the function to produce one or more complete path definitions. These complete path definitions are then passed to matching engine 8 which, with reference to a store 60 of subscribers and topics subscribed to, records any new subscriber/topic combinations arising from the use of the function. As denoted by reference number 62 in FIG. 4, conventionally-published messages (to a single topic) are passed from message store 6 to matching engine 8 for onward distribution to those subscribers that have subscribed to the individual topics listed.

An example method according to the invention will now be described with reference to the flowchart of FIG. 6. The method starts at step 100 with the broker receiving, from a publisher 1 or subscriber 3, a function message as in FIG. 5B containing a partial topic tree path definition and associated function. At step 102, the function is extracted from the message and, at step 104, the extracted function is used to guide a search of the topic tree.

At step 106, a determination is made as to whether the search has located any candidate partial path segments. If not, the procedure terminates, and the received function will remain effectively dormant on the system until the topic tree is modified such that there is at least one matching candidate. If the test at step 106 indicates that one or more candidate path segments have been located, then at step 108, the first of those segments is called up, and at step 110, the segment is inserted into a copy of the partial path segment to create a complete path definition. At step 112, the complete path definition is stored.

At step 114, a determination is made as to whether all candidate segments located by the search of the topic tree have been processed, and if not, the process returns to step 108, where the next candidate is selected. The loop of steps 108, 110, 112, and 114 repeats until all candidate segments have been selected and inserted into respective copies of the partial path definition, following which the process moves to step 116, where messages are routed according to the newly-completed path definitions. As will be recognised, where the function data message has originated from a particular publisher, the effect of step 116 will be for the message from that publisher being published to topics identified by the newly-completed path definitions. Where the function data message has originated from a particular subscriber, the effect of step 116 will be for that subscriber to be subscribed to each of the topics identified by the newly-completed path definitions.

The flowchart of FIG. 7 illustrates a method by which the facility of guided topic tree searching may be extended to more users than the originators of function data messages. The process starts at step 120 with the receipt of a message identifying a particular function. At step 122, a check is made as to whether this function already exists at the broker. If not, it is processed as a new function according to steps 100-114 of the method of FIG. 6 (as noted at reference number 123). If the test at step 122 shows the function to already exist at the broker, the next step 124 determines whether the identifying message comes from the originator of the stored function. If so, no further action is required and the procedure continues at step 116 by routing messages, else the process moves to step 126, in which the message sender is enabled as an additional publisher or an additional subscriber to each of the topics identified by the execution of the particular function.

FIG. 8 represents a simple checking function that may suitably be applied, such that the search of the topic tree is performed periodically in respect of each previously-stored selection function, with any existing stored messages being routed to subscribers to topics identified by any newly-resulting complete path definitions. Following execution of the (or each) stored function at step 130, a check is made at step 132 to identify whether a trigger condition has occurred such as to require re-execution of the stored functions. If so, the process returns to step 130. If not, the process enters a wait state at step 134 before returning to step 130. As will be appreciated, an appropriate trigger condition causing a positive result at step 132 would be a detection that the topic tree has been modified.

As mentioned above, with reference to input command COMM 402 in FIG. 4, an embodiment may further support modifying (also referred to herein as amending) or deleting previously-stored function data. This is illustrated by the flowchart of FIG. 9 in which, following the start 140, at step 142 a selection function modification command message is received. At step 144, the message is parsed to identify the command, and at step 146, the command is validated. The validation suitably not only checks whether the command is supported by the system, but also whether it is from a source approved to issue such a command. For example, where the command is to delete a particular stored function, permission to delete may be restricted to the publisher or subscriber that originated that function and to a system administrator. Commands to amend functions rather than delete may similarly be restricted, with the system maintaining a list of stored functions, with read/write access permissions for each. The Access Control List feature in the Lotus® Expeditor product is an example of how such a list of permissions may be maintained. ("Lotus" is a registered trademark of International Business Machines Corporation in the United States, other countries, or both.)

If the validity check at step 146 proves negative, at step 148 an error message is generated, suitably as a message to the originator of the command. Such an error message might indicate that the function sought to be amended or deleted does not exist on the system, or that the requester does not have the requisite permission to cause the amendment or deletion.

If the validity check at step 146 is positive, the process moves to step 150, in which the identified function is amended or deleted. Optionally, a confirmation message (not shown) may be returned to the requester following modification/deletion step 150, following which the process ends at 152.

Whilst deletion of stored functions is relatively straightforward, amending an existing stored function is more complex, requiring knowledge of the stored form of the function. Where permission to amend is limited to the function originator, the simplest method to achieve amendment is for the originator to simply republish the function message (in amended form) to the same partial topic tree path, such that it overwrites the original version of the function. In like manner, deletion may simply be achieved by publishing a null message to the original function location.

With the above-described approach, the client is given the ability to register functions in a specially-reserved part of the topic tree. As noted earlier, this part of the topic tree could be fixed at a reserved location for all servers, or an administrator-defined topic area could be reserved instead, as shown by the example in FIG. 2, where all selection functions are stored under the topic/functions.

As also stated earlier, the reserved function topic stores both the function definitions and the code associated with that function. The name and parameters of the function are stored as a subtopic of the reserved function area, and the function code is the payload of that sub-topic. For example, the function myFunction(params) would be stored on the topic tree as shown in FIG. 10A.) The statements implementing the selection function may be coded, for example, in an arbitrary scripting language.

FIG. 10B provides an example selection function named "ibmBrands", where the user is interested in specific products of International Business Machines Corporation.

As can be seen, the "ibmBrands" selection function returns specific path definition segments, depending on the value of the input parameter named "type". For example, if the input parameter value is "software", then the selection function returns path definition segments "WebSphere", "Rational", "Information_Management", "Tivoli", and "Lotus", and if the input parameter value is "hardware", then the selection function returns path definition segments "System_i", "System_p", "System_z", and "System_x", whereas a conventional wildcard would return all of these IBM product names. ("WebSphere", "Rational", "Tivoli", "System i", "System p", "System x", and "System z" are registered trademarks of International Business Machines Corporation in the United States, other countries, or both.)

Suitably, all messages published under the reserved function topic (which is /functions, in the example) are retained by the broker, regardless of a client's "retain flag" when defining a function (as discussed in more detail below).

As has been described above, user-defined functions may be used when publishing and subscribing to a broker. Another reserved symbol (in addition to + and #, which are already found in wildcards) is defined and is used to represent a function call. For example, $myFunction represents a function using the dollar symbol.

The reserved symbol can be used during subscription by allowing a user to subscribe to, for example, /a/b/$myFunction(value, . . . )/x/y/z. Upon receipt of this subscription, the broker runs the function, automatically subscribing the client to the topics as enumerated by filling in the strings that are returned from the function call. The client would thus be subscribed to zero, one, or several topics as a result.

The reserved symbol can also be used during publish by allowing a user to publish to a similarly-styled topic. During publish, the broker will enumerate the responses from the function call and publish the payload to each topic.

In a more detailed example, referring to the simple topic tree of FIG. 2, a user defines a function that returns a list of cities near a given location, where the location is specified using two parameters—longitude and latitude. The user publishes their function to the function area of the topic tree using their client. For this example, the topic tree now additionally shows:

/functions/citiesNear(longitude, latitude)→{ . . . }

Suppose the topic tree contains some locational information for different countries, cities within those countries, and some information about each city. The user—or any other user—could now subscribe to the topic /country/uk/city/$citiesNear(X, Y)/temperature/celsius to receive the temperature of nearby cities, based upon the output from the "citiesNear" selection function. If longitude and latitude co-ordinates were passed in representing some location in Hampshire, for example, the cities returned might be London and Southampton, with the result that the user would be subscribed to two topics 201, 202 of FIG. 2.—i.e., a topic for each of these nearby cities. Thus, the user will receive the payloads 1 and 3, respectively, where the payloads are the values shown at the right-hand side of the topic tree entries 201, 202 in FIG. 2. Importantly, if another city were added to the topic tree at a later date, the user would also be subscribed to a topic for that city if it were returned by the "citiesNear" selection function. If Winchester were brought online in this example, then the users would also be subscribed to Winchester updates as being a city near Hampshire, but not if Belfast were brought online, as Belfast is too far from Hampshire to be included in the selection of nearby cities.

Suppose an additional function is registered to the topic tree to return towns by political boundary, given a constituency name. (Towns may also be in the topic tree discussed above, but have not been shown for brevity.) The function part of the topic tree now includes the original "citiesNear" selection function, plus the newly-registered "townByConstituency" selection function, as follows:

/functions/citiesNear(longitude, latitude)→{ ... }
/functions/townByConstituency(constituency)→{ ... }

The user originating the newly-registered selection function (or any other user) could now publish to the topic, for example to change the name of the incumbent Member of Parliament in towns. A publish to the topic /functions/$townByConstituency("Hampshire East")/mp/name would update the name of the MP in all the towns of the Hampshire East constituency, in this example.

Within the system, multiple levels of function call are permitted. For example, subscribe("/country/$villagesNear($largeTowns/latitude, $largeTowns/longitude)/population") would subscribe the user to the population topic for all villages that are near "large towns". The parentheses separate the functions, which are handled in the order of inside to outside.

It is important to note that the subscriptions are sustained in the same way that normal topic subscriptions are in conventional publish/subscribe systems. As a result, every time a user publishes to a topic that another user is subscribed to, via a function, the subscriber will be notified of the resulting published value.

As mentioned above, the previously-stored selection functions can be amended by simply re-publishing a payload to the same topic. Typical publish/subscribe systems provide for some level of message persistence, whereby at least some messages may be retained on the system after delivery to subscribers. In the present invention, all selection functions should be published with a retained flag value set to true so that the selection functions exist permanently (i.e., until a null message is published to delete a particular stored selection function).

Whilst embodiments of the present invention have been described above, the technical scope of the invention is not limited to the scope of the above-described embodiments. It should be apparent to those skilled in the art that various changes or improvements can be made to the described embodiments. It is apparent from the description of the appended claims that implementations including such changes or improvements are encompassed in the technical scope of the invention.

The invention claimed is:

1. An apparatus in a publish/subscribe messaging environment for routing messages received from at least a first publisher to one or more subscribers according to one or more defined paths through a topic tree that defines topics for routing the messages, the apparatus comprising:
   a processor;
   a memory coupled with the processor and holding data defining the topic tree;
   a first message handler for receiving a message, the message including selection function data defining a selection function, with the handler being adapted to identify and extract the selection function data and store the extracted selection function data in the data defining the topic tree;
   a further message handler adapted to create, from the received message, a pseudo-topic tree path comprised of a partial path definition and a representation of the selection function;
   a search engine coupled with the memory and adapted to search the data defining the topic tree, according to the selection function, and to return one or more path definition segments resulting from the search;
   an inserter coupled with the further message handler and the search engine and adapted to insert each of the one or more returned path definition segments into respective copies of the pseudo-topic tree path, in place of the representation of the selection function, to produce one or more complete path definitions from the partial path definition; and
   a matching engine coupled with the inserter and adapted to route messages according to each of the one or more produced complete path definitions.

2. An apparatus as claimed in claim 1, wherein:
   a first subscriber subscribes to a pseudo-topic by originating the message including the selection function data defining the selection function of which a particular pseudo-topic tree path representing the pseudo-topic is comprised; and
   the matching engine is adapted to route, to the first subscriber, all messages having a topic that matches any of the one or more produced complete path definitions.

3. An apparatus as claimed in claim 1, wherein:
   a first publisher establishes a pseudo-topic by originating the message including the selection function data defining the selection function of which a particular pseudo-topic tree path representing the pseudo-topic is comprised; and
   the matching engine is adapted to route, from the first publisher, all messages having a topic that matches any of the one or more produced complete path definitions.

4. An apparatus as claimed in claim 1, wherein:
   the search engine is adapted to periodically perform the search of the data defining the topic tree, in respect of each stored selection function; and
   the matching engine is adapted to route existing messages to subscribers to topics matching any complete path definition produced as a result of the periodically-performed search.

5. An apparatus as claimed in claim 4, wherein the search engine is adapted to perform the search responsive to detecting that the data defining the topic tree is modified.

6. An apparatus as claimed in claim 1, wherein the first message handler is adapted to, on receipt of a predetermined command, modify or delete stored selection function data for a particular selection function identified in the predetermined command.

7. An apparatus as claimed in claim 1, wherein the first message handler is adapted to store the selection function data in a predetermined location within the data defining the topic tree.

8. A computer-implemented method of message routing in a publish/subscribe messaging environment where messages are routed from one or more publishers to one or more subscribers according to respective defined paths through a topic tree that defines topics for routing the messages, comprising:
   creating a pseudo-topic tree path comprised of a partial path definition and a representation of a selection function, wherein the selection function, when executed, searches the topic tree to identify one or more path definition segments;
   replacing the representation of the selection function in the pseudo-topic tree path with respective ones of the identified one or more path definition segments to generate one or more complete path definitions; and
   routing messages according to the one or more generated complete path definitions.

9. A method as claimed in claim 8, wherein a first subscriber subscribes to a pseudo-topic by originating the selection function used to create the pseudo-topic tree path representing the pseudo-topic, and responsive to the subscribing, all messages having a topic defined by any of the one or more generated complete path definitions are routed to the first subscriber.

10. A method as claimed in claim 9, wherein a second subscriber subscribes to a pseudo-topic originated by the first subscriber, and responsive to the subscribing by the second subscriber, all messages having a topic defined by any of the one or more generated complete path definitions are routed to the second subscriber.

11. A method as claimed in claim 8, wherein a first publisher establishes a pseudo-topic by originating the selection function used to create the pseudo-topic tree path representing the pseudo-topic, and responsive to the establishing, all messages published to the pseudo-topic by the first publisher are published to topics identified by the one or more generated complete path definitions.

12. A method as claimed in claim 11, wherein, responsive to receipt of a request from a second publisher, messages from the second publisher are published to subscribers to topics identified by the pseudo-topic established by the first publisher.

13. A method as claimed in claim 8, wherein the searching of the topic tree is performed periodically, in respect of each of at least one selection function, and existing messages are routed to subscribers to topics identified by any complete path definition that is generated by executing the replacing using the one or more path definition segments that are identified by the periodic search.

14. A method as claimed in claim 13, wherein the search is performed responsive to detecting that the topic tree is modified.

15. A computer program stored on a non-transitory computer readable medium and loadable into an internal memory of a digital computer, the computer program comprising software code portions which are executable, when the computer program is run on the digital computer, for enabling messages from one or more publishers to be routed to one or more subscribers according to defined paths through a topic tree that defines topics for routing the messages, in a publish/subscribe messaging environment, comprising:
   creating a pseudo-topic tree path comprised of a partial path definition and a representation of a selection function, wherein the selection function, when executed, searches the topic tree to identify one or more path definition segments;
   replacing the representation of the selection function in the pseudo-topic tree path with respective ones of the identified one or more path definition segments to generate one or more complete path definitions; and
   routing messages according to the one or more generated complete path definitions.

* * * * *